United States Patent
McCullough et al.

(10) Patent No.: US 7,235,918 B2
(45) Date of Patent: *Jun. 26, 2007

(54) THERMALLY-CONDUCTIVE PLASTIC ARTICLES HAVING LIGHT REFLECTING SURFACES

(75) Inventors: Kevin McCullough, North Kingstown, RI (US); James Miller, Marietta, GA (US); E. Mikhail Sagal, Wakefield, RI (US)

(73) Assignee: Cool Options, Inc., Warwick, RI (US)

( * ) Notice: Subject to any disclaimer, the term of this patent is extended or adjusted under 35 U.S.C. 154(b) by 380 days.

This patent is subject to a terminal disclaimer.

(21) Appl. No.: 10/459,254

(22) Filed: Jun. 11, 2003

(65) Prior Publication Data

US 2004/0251804 A1    Dec. 16, 2004

(51) Int. Cl.
*G02B 5/00* (2006.01)
*G02B 5/12* (2006.01)

(52) U.S. Cl. .................. 313/114; 359/838; 359/853; 428/411.1; 428/412; 428/35.8

(58) Field of Classification Search ............... 313/113, 313/318.11; 362/487, 507, 506, 499, 514, 362/519, 296, 310, 587; 359/520, 522, 524, 359/528, 529, 533, 548
See application file for complete search history.

(56) References Cited

U.S. PATENT DOCUMENTS

| | | | |
|---|---|---|---|
| 4,188,358 A | 2/1980 | Withoos et al. ............. 264/255 |
| 4,364,637 A | 12/1982 | Ohno et al. .................. 350/288 |
| 4,507,254 A | 3/1985 | Daniels et al. ............... 264/1.9 |
| 4,570,203 A | 2/1986 | Daniels et al. ................ 362/16 |
| 4,617,618 A | 10/1986 | Baciu et al. ................. 362/341 |
| 5,754,338 A * | 5/1998 | Wilson et al. .............. 359/530 |
| 5,865,530 A * | 2/1999 | Weber ........................ 362/341 |
| 5,916,496 A | 6/1999 | Weber .......................... 264/1.9 |
| 5,945,775 A * | 8/1999 | Ikeda et al. .................. 313/113 |
| 6,251,978 B1 | 6/2001 | McCullough ............... 524/404 |
| 6,786,620 B1 * | 9/2004 | Takezawa ................... 362/345 |

FOREIGN PATENT DOCUMENTS

| | | | |
|---|---|---|---|
| EP | 351660 A2 | * | 1/1990 |
| FR | 0267848 | * | 11/1987 |
| JP | 54111547 A | * | 8/1979 |
| JP | 60065064 A | * | 4/1985 |
| JP | 02163137 | * | 2/1990 |
| JP | 2001-118974 | * | 4/2001 |

* cited by examiner

*Primary Examiner*—Mariceli Santiago
(74) *Attorney, Agent, or Firm*—Barlow, Josephs & Holmes, Ltd.

(57) ABSTRACT

A thermally-conductive polymer composition suitable for making molded reflector articles having light-reflecting surfaces is provided. The composition comprises: a) about 20% to about 80% by weight of a base polymer matrix such as polycarbonate; and b) about 20% to about 80% by weight of a thermally-conductive carbon material such as graphite. The composition can be used to make reflector articles such as housings for automotive tail lamps, head lamps, and other lighting fixtures. A method for manufacturing reflector articles is also provided.

7 Claims, 3 Drawing Sheets

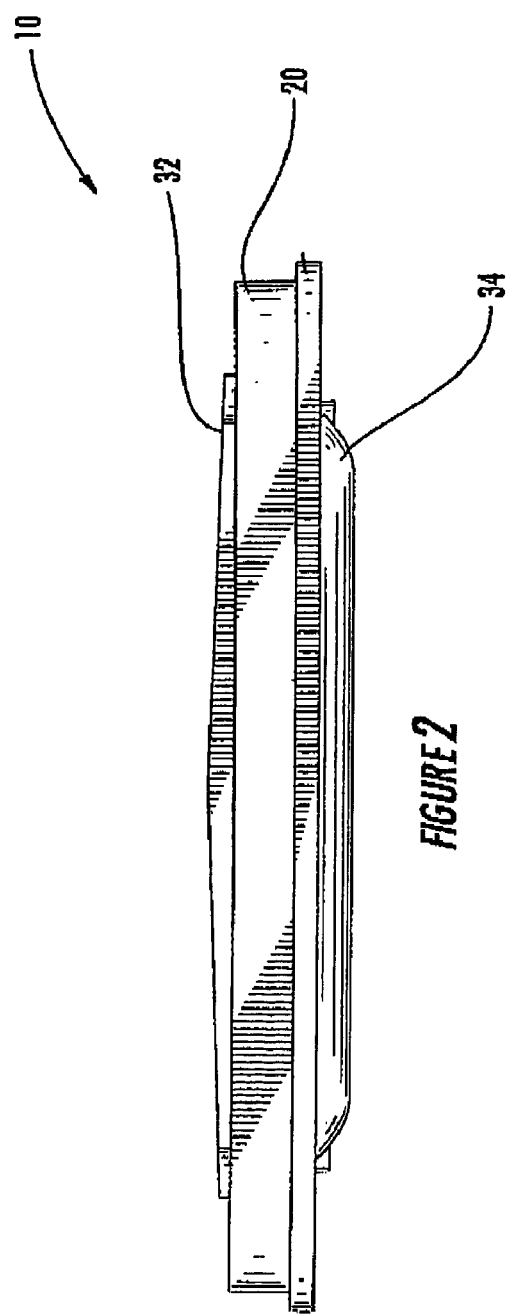

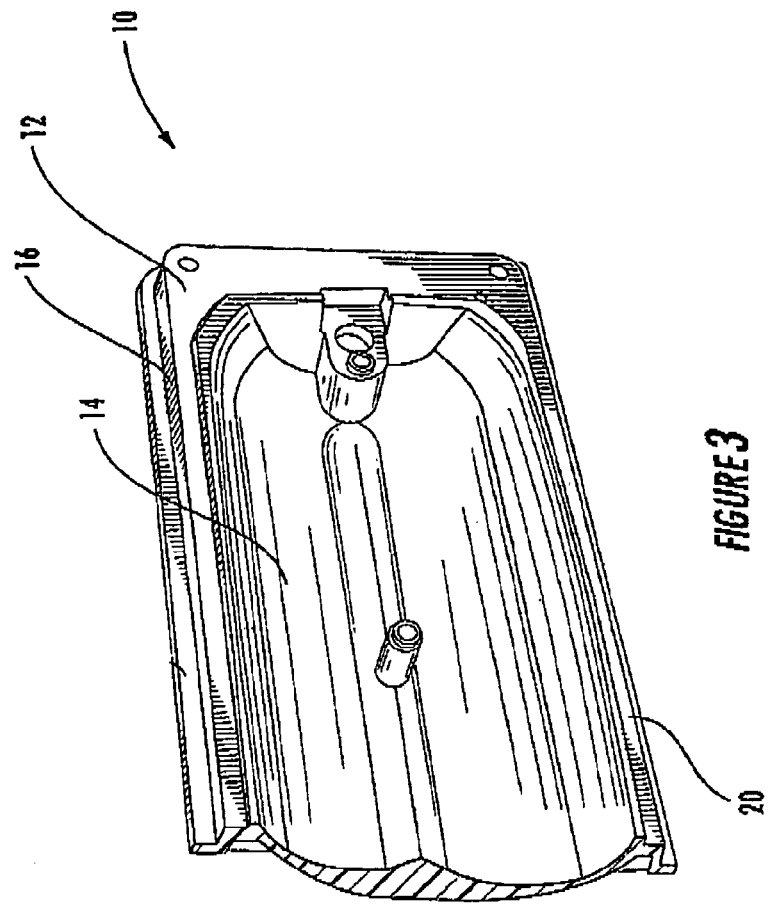

THERMALLY-CONDUCTIVE PLASTIC ARTICLES HAVING LIGHT REFLECTING SURFACES

BACKGROUND OF THE INVENTION

The present invention generally relates to plastic articles having light reflecting surfaces. Particularly, the articles are made from a thermally-conductive polymer composition that can dissipate heat from a heat-generating light source within the articles. The reflector articles can be used as housings for automotive tail lamps and head lamps, flashlights, searchlights, and other lighting fixtures.

In the past, reflector articles or housings for lighting devices were made by stamping sheets of metal, for example, steel or aluminum, into a desired shape. Then, the surface of the metal could be buff-polished to form a reflective surface. This metal-stamping process produced reflector housings having good mechanical strength, but only a limited number of simple shapes could be made using this cumbersome process. Also, the polishing process could be time-consuming and expensive.

Today, reflector housings are often made from thermosetting or thermoplastic compositions that can be molded into a variety of complex shapes. Typically, these compositions contain a resin and a reinforcing material that improves the strength and dimensional stability of the molded reflector housing.

For example, Withoos et al., U.S. Pat. No. 4,188,358 discloses a method for making a metallized plastic reflector. A film or fabric of fibrous material (for example, glass or carbon fibers) is provided over a convex surface of a mold and saturated with a thermo-hardening synthetic resin. After partial hardening of the resin, a layer of liquid metal particles is sprayed onto the resin. A supporting layer including a synthetic resin reinforced with fibrous material (for example, polyester or nylon) is provided over the metal layer. After hardening of the assembly, the mold is removed.

Ohio et al., U.S. Pat. No. 4,364,637 discloses a method of making a highly reflective plastic reflector having a crystalline inorganic film coating. The method involves making a reflector having a molded body comprising a thermoplastic or thermosetting resin. The Patent discloses that the resins may be filled with reinforcing fillers such as glass fibers, mica, and asbestos. A light-reflective meal such as silver or aluminum is coated on one or all sides of the molded body. A light-transmissive film of an inorganic substance such as a metallic oxide or oxide of amphoteric elements is coated over the metallized coating.

Daniels et al., U.S. Pat. Nos. 4,507,254 and 4,570,203 disclose a method of making a light reflector for a photographic flash unit. The method involves molding a plastic housing using an injection-molding process. According to the patents, the reflector is shaped into its trough-like configuration by injecting liquid plastic into a mold. The plastic is allowed to solidify to form the plastic housing which maintains the contour of the reflector. The Patents disclose that polycarbonate can be used as the plastic in this manufacturing operation.

Ikeda et al., U.S. Pat. No. 5,945,775 discloses a lamp reflecting mirror suitable for use as a automotive head lamp, fog lamp, or the like. The Patent discloses that the lamp reflecting mirror is produced by injection-molding a composition containing 30 to 50% by weight of polyphenylene sulfide resin, 5 to 30% by weight of calcium silicate whiskers, and 20 to 65% by weight of granular inorganic filler.

As discussed above, conventional reflectors typically are coated with a light-reflective metal, such as aluminum, silver, chromium, and the like, using a vacuum-coating process. It is important for the reflector article to have a smooth surface so that the metallized, reflective coating can be uniformly deposited on the surface of the article. Many conventional reflector articles have rough and irregular surfaces, and it can be difficult to uniformly deposit the metallized coating onto such surfaces. There is a need for a reflector article having a smooth surface which will accept a metallized, light-reflecting coating easily. The reflective coating should be capable of being applied completely and uniformly to the surface of the reflector article. The present invention provides such a reflector article.

In addition, the light sources contained within reflector housings, for example, automotive tail lamps, can generate a tremendous amount of heat. Many reflector housings are made from molded plastics that are poor conductors of heat. As a result, heat remains trapped within this reflective area, and temperatures can quickly rise causing damage to the lighting device. There is a need for a thermally-conductive reflector that can effectively remove heat from heat-generating lamp assemblies. The present invention provides such a thermally-conductive reflector housing. The present invention also includes the thermally-conductive compositions and methods used to make such reflector housings. These and other objects, features, and advantages of the invention are evident from the following description and attached figures.

SUMMARY OF THE INVENTION

The present invention relates to thermally-conductive polymer compositions that can be used to make plastic reflector articles having light reflecting surfaces. The compositions comprise: a) about 20% to about 80% by weight of a base polymer matrix; and b) about 20% to about 80% by weight of a thermally-conductive carbon material. The thermally-conductive carbon material can be used in any suitable form. For example, graphite, carbon black particles, and carbon fibers can be used. The polymer composition may further comprise about 5% to about 30% of a reinforcing material such as glass to strengthen the polymer matrix. Additives such as antioxidants, plasticizers, stabilizers, dispersing agents, coloring agents, and mold-releasing agents can be incorporated into the composition. In a preferred embodiment, the polymer composition comprises about 74 weight % polycarbonate, about 24 weight % graphite, and about 1 weight % mold-releasing agent.

The polymer compositions can be used to make plastic reflector articles such as housings for automotive tail lamps and head lamps having light reflecting surfaces. The reflector articles can be made using an injection molding process. The process involves providing a molten polymer composition comprising: i) about 20% to about 80% by weight of a base polymer matrix; and ii) about 20% to about 80% by weight of a thermally-conductive carbon material. The molten composition is injected into a mold to form a net-shape molded thermally-conductive reflector article.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description taken in connection with the accompanying drawings in which:

FIG. 2 is a side perspective view of the reflector article shown in FIG. 1 equipped with a cover; and FIG. 3 is a cross-sectional view of a reflector article of the present invention shown through line A-A in FIG. 1.

DETAILED DESCRIPTION OF THE PREFERRED EMBODIMENTS

Figure 1:
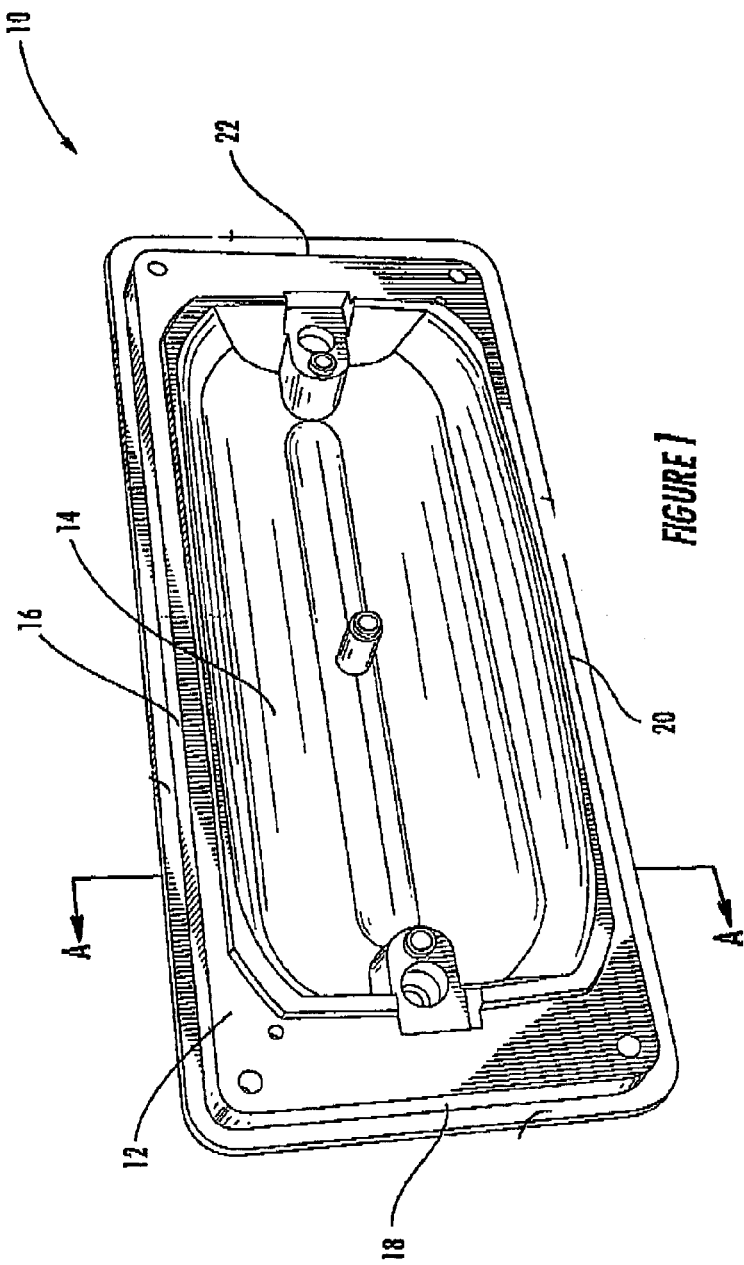
FIG. 1 is a perspective view of a thermally-conductive reflector article made in accordance with the present invention.

The present invention relates to thermally-conductive reflector articles and methods for making such articles. The invention also includes the compositions used to make such articles.

A thermally-conductive polymer composition is used to make the reflector articles of this invention. This composition contains a base polymer matrix and thermally-conductive material. Thermoplastic polymers such as polycarbonates, polyethylene, polypropylene, acrylics, vinyls, fluorocarbons, polyamides, polyphenylene sulfide, and liquid crystal polymers such as thermoplastic aromatic polyesters, can be used to form the matrix. Alternatively, thermosetting polymers such as elastomers, epoxies, polyesters, polyimides, and acrylonitriles can be used as the matrix. Suitable elastomers include, for example, styrene-butadiene copolymer, ethylene-propylene terpolymers, polysiloxanes (silicones), and polyurethanes. Polycarbonates are preferred due to their ability to be easily molded into the reflector articles. Further, polycarbonates are substantially non-corrosive and have good weather and ozone resistance. In addition, polycarbonates are dimensionally stable and have high impact strength. Generally, the base polymer matrix comprises about 20 to about 80% by weight of the total composition and more particularly about 40 to about 80% by weight of the composition.

In the present invention, a carbon material such as carbon black, graphite, carbon fiber, or the like is added to the base polymer matrix. Mixtures of such carbon materials are also suitable. The carbon material imparts thermal conductivity to the non-conductive polymer matrix. In the present invention, graphite is particularly preferred due to its high thermal conductive properties and mechanical strength. Generally, the thermally-conductive carbon materials comprise about 20 to about 80% by weight of the total composition and more particularly about 20 to about 60% by weight of the composition.

The carbon material can be in the form of particles, granular powder, whiskers, fibers, or any other suitable form. The particles or granules can have a variety of structures and a broad particle size distribution. For example, the particles or granules can have flake, plate, rice, strand, hexagonal, or spherical-like shapes with a particle size in the range of 0.5 to 300 microns.

In some instances, the carbon material can have a relatively high aspect (length to thickness) ratio of about 10:1 or greater. For example, PITCH-based carbon fiber having an aspect ratio of about 50:1 can be used. Alternatively, the carbon material can have a relatively low aspect ratio of about 5:1 or less. For example, carbon particles having an aspect ratio of about 4:1 can be used. Both low aspect and high aspect ratio materials can be added to the base polymer matrix as described in McCullough, U.S. Pat. No. 6,048,919, the disclosure of which is hereby incorporated by reference. Particularly, the compositions of this invention can contain about 25 to about 60% by weight of a thermally-conductive carbon material having a high aspect ratio of about 10:1 or greater, and about 10 to about 25% by weight of a thermally-conductive carbon material having a low aspect ratio of about 5:1 or less.

An optional reinforcing material can be added to the polymer matrix. The reinforcing material can be glass, inorganic minerals, or other suitable material. The reinforcing material strengthens the polymer matrix and provides the molded article with greater mechanical strength and integrity. The reinforcing material, if added, constitutes about 5% to about 30% by weight of the composition. Also, if desired, the polymeric mixture may contain additives such as, for example, flame retardants, antioxidants, plasticizers, dispersing aids, coloring agents, and mold-releasing agents. Examples of mold-releasing agents which can be used in accordance with this invention include metal stearates such as calcium or zinc stearate.

In one preferred embodiment of the present invention, the polymer composition comprises about 74 weight % polycarbonate, about 24 weight % graphite, and about 1 weight % mold-releasing agent based on weight of the composition.

The thermally-conductive carbon material and optional additives (such as the mold-releasing agent and reinforcing glass) are intimately mixed and dispersed within the non-conductive polymer matrix to form the polymer composition. The mixture can be prepared using techniques known in the art. The ingredients should be mixed under low shear conditions in order to avoid damaging the structures of the thermally-conductive carbon materials.

Significantly, the polymer compositions used to make the reflector articles of this invention have a thermal conductivity of greater than 10 W/m° K. These good heat conduction properties are critical for making an improved reflector article that can better dissipate heat from a heat-generating light source.

The reflector articles of the present invention are made using an injection-molding process. Conventional injection-molding machines can be used. The injection-molding process generally involves loading pellets of the polymer composition into a hopper. The hopper funnels the pellets into a heated extruder (barrel), wherein the pellets are heated to form a molten composition (liquid plastic). The extruder feeds the molten polymer composition into a chamber containing an injection piston. The piston moves forward and forces a shot of the molten composition into a mold. Typically, the mold for the reflector article contains two molding sections that are aligned together in such a way that a molding chamber or cavity is located between the sections. However, it is understood that the mold can have any structure for producing the desired shape of the reflector. The molten material remains in the mold under high pressure until it cures and cools. Then, the molded reflector article is removed from the mold.

The molding process parameters can be adjusted depending on the desired molded reflector article that will be produced in accordance with this invention. For example, the heated barrel temperature can be adjusted to help control the viscosity of the molten material. If the barrel temperature is too cool, the material tends to have a high viscosity and this can lead to processing difficulties. If the barrel temperature is too hot, the material can gel. The barrel residence time is also important to maintain a homogeneous mixture that can be injected into the mold. The injection pressure, injection speed (flow rate of the composition), hold pressure in the mold, mold temperature, and cure time can be adjusted accordingly.

The injection speed and flow rate of the molten polymer composition into the mold are important. If the injection speed and flow rate are too slow, the surface of the molded reflector article can be rough and pitted. This rough surface can be caused by the thermally-conductive particles in the composition separating from the polymer matrix and migrating to the surface. Many conventional polymer compositions have relatively slow flow rates and can produce rugged, uneven surfaces when the compositions are injection-molded. However, the polymer compositions of the present invention are characterized by having a relatively high flow rate. The thermally-conductive materials are completely and uniformly dispersed within the polymer composition, thus making the composition more fluid. The polymer composition tends to flow smoothly and rapidly into the mold sections, thereby producing a molded reflector article having a substantially smooth and glossy-like surface.

The reflector article of the present invention is characterized by having a substantially smooth and glossy surface. The surface of the reflector article is substantially free of any pits, jagged points, or other surface defects. The smooth surface of the reflector article means that the surface can be coated with a metallized reflective coating. If desired, a base or primer coating can be applied first to the smooth surface of the reflector article.

Referring to FIG. 1, one embodiment of a reflector article 10 of the present invention is shown. In FIG. 1, the reflector article 10 is a housing for an automotive tail lamp. The reflector article 10 has a rectangular-like shape comprising a generally planar rear surface (not shown) and a front surface 12 containing a recessed area 14, wherein a lamp assembly (not shown) may be installed. The sidewall portions 16, 18, 20, and 22 form the frame of the reflector article.

As shown in FIG. 2, a cover or lid 32 may be fastened over the recessed portion 14 of the reflector article 10. The cover 32 protects the lamp assembly (not shown) that is contained within the recessed area 14. The cover 32 can be transparent so that light transmitted by the light assembly within the article 10 is visible. In FIG. 2, the planar rear surface 34 of the reflector article 10 is also shown.

FIG. 3 is a cross-sectional view of the reflector article 10 through line A-A in FIG. 1. The front or upper surface 12 of the reflector article 10 containing the recessed area 14 is shown from a cross-sectional perspective in FIG. 3.

The surface of the reflective article is coated with a light-reflecting metal. The application of the metallized coating typically is carried out using a vacuum-coating process known in the art. These vacuum-coating methods involve vacuum-depositing liquid metal onto the surface of the reflector article. The liquid metal is evaporated onto the surface of the article at a desired thickness. Suitable light-reflective metals include, for example, aluminum, silver, chromium, nickel, platinum, and alloys thereof. Also, colored metals such as copper and gold and metallic compounds such as brass and titanium nitride can be used. Aluminum and silver are most commonly used. The thickness of the metallized, reflective coating can be adjusted depending on the intended end-use application of the reflector article.

A protective transparent film can be applied over the reflective, metallized coating using the vacuum-coating method. The transparent film can comprise inorganic oxides such as silicon dioxides; glass or ceramics. The protective film prevents the degradation of the metallized, reflective layer. Acrylic resins can also be used, and these resins can be sprayed onto the surface rather than vacuum-coated.

The molded thermally-conductive reflector articles of the present invention have many advantageous features over conventional reflector articles including the following. First, the reflector articles have a relatively smooth and glossy-like surface which can be uniformly coated with a metallized light-reflecting layer. Because there are no substantial surface defects, the reflective coating is able to accurately and completely reflect light that is directed onto the surface of the article.

In addition, the reflector articles of the present invention have improved thermal conductivity properties. Preferably, the articles have a thermal conductivity of greater than 10 W/m° K. Referring to FIG. 1, these heat transfer properties allow the body of the reflector 10 to remove heat from the enclosed recessed portion 14, wherein heat generated from a light assembly (not shown) can build up quickly. The molded reflector article 10 efficiently dissipates the heat and prevents overheating of this enclosed area 14.

Further, the reflector articles can be net-shape molded meaning that the final shape of the article is determined by the shape of the mold cavity. No additional processing, die-cutting, machining, or other tooling is required to produce the final shape of the reflector article.

It is appreciated by those skilled in the art that various changes and modifications can be made to the description and illustrated embodiments without departing from the spirit of the present invention. All such modifications and changes are intended to be covered by the appended claims.

What is claimed is:

1. A molded reflector article having a light-reflecting surface, said article comprising:
    about 50% to about 80% by weight of a base polymer matrix; and
    about 20% to about 50% by weight of a thermally-conductive carbon material, the composition having a thermal conductivity of greater than 10 W/m° K.

2. The molded reflector article of claim 1, wherein the article is in the form of a housing for an automotive tail lamp.

3. The molded reflector article of claim 1, wherein the article is in the form of a housing for an automotive head lamp.

4. The molded reflector article of claim 1, wherein the polymer matrix comprises a thermoplastic polymer.

5. The molded reflector article of claim 1, wherein the polymer matrix comprises a thermosetting polymer.

6. The molded reflector article of claim 1, wherein the polymer composition further comprises about 5% to about 30% by weight of a reinforcing material.

7. The molded reflector article of claim 1, wherein the polymer composition comprises about 74% by weight of polycarbonate, about 24% by weight of carbon graphite, and about 1% by weight of a mold-releasing agent.

* * * * *